May 14, 1957     J. R. ALEXANDER ET AL     2,792,285
PRODUCTION OF ALKALI METAL PHOSPHATES
Filed July 17, 1953
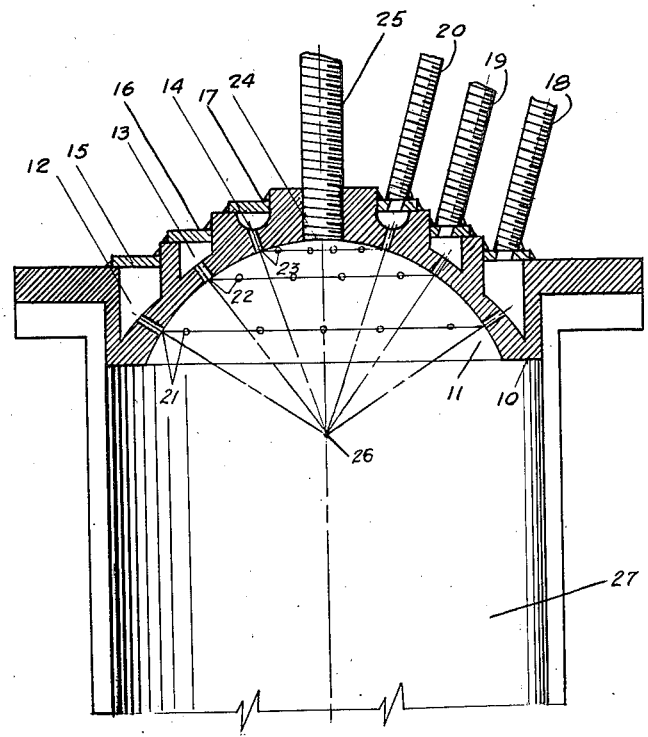
INVENTOR.
JOHN R. ALEXANDER
JOE S. METCALF
BY
ATT'Y.

United States Patent Office 2,792,285
Patented May 14, 1957

2,792,285

PRODUCTION OF ALKALI METAL PHOSPHATES

John R. Alexander, Kirkwood, Mo., and Joe S. Metcalf, Dayton, Ohio, assignors to Monsanto Chemical Company, St. Louis, Mo., a corporation of Delaware Application July 17, 1953, Serial No. 368,616

7 Claims. (Cl. 23—106)

This invention relates to a method of producing alkali metal phosphates. More particularly, this invention relates to a method of producing alkali metal phosphates by a process which utilizes an alkali metal salt in a direct reaction with phosphorus and oxygen.

Practically all of the commercially available sodium phosphate salts produced at the present time are manufactured from phosphoric acid and soda ash. In the past, many investigators have spent a great deal of time attempting to develop a process for the production of sodium phosphate salts directly from elemental phosphorus and an alkali metal salt without first having to convert the phosphorus to phosphoric acid. Most of the proposed processes for the direct utilization of phosphorus and alkali metal salt have involved the use of the salt in a liquid phase, usually as molten salt at a relatively high temperature. None of the proposed processes has met with any commercial success, primarily because of factors such as difficulty in finding suitable equipment to withstand the corrosive action of molten phosphate salts at the very high temperature necessary to carry out the reaction, and inability to produce a product sufficiently free from contamination by unreacted salts under practical conditions of operation.

It has now been found that alkali metal phosphates can be produced directly from other alkali metal salts and elemental phosphorus quickly, simply and economically by a novel reaction in which the alkali metal salt reactants and products are never present as a discrete continuous molten phase, but rather are suspended in and carried by an incandescent gaseous reaction mass. More specifically, it has been found that alkali metal phosphates can be produced very advantageously by the reaction of elemental phosphorus, oxygen and an alkali metal salt of an oxy acid of carbon, nitrogen or sulfur in a gaseous reaction mass or zone maintained at very high temperatures.

By appropriate modifications of the proportions of reactants, the present invention can be utilized to produce phosphates ranging from those of relatively low alkalinity, such as the metaphosphates, to those of relatively high alkalinity, such as the pyrophosphates or orthophosphates. Because there are substantial doubts as to the actual existence, as compounds, of many of the alkali metal phosphates previously reported or suggested in the literature, and since all alkali metal phosphate compositions can be expressed in terms of a generalized formula $(M_2O)_x (P_2O_5)_y$ wherein M is an alkali metal and wherein the ratio of $x$ to $y$ can vary continuously from 1:1 to 3:1, the use of this generalized formula will be utilized in the description of the present invention. Thus, by way of example, sodium metaphosphate $(NaPO_3)$ will be expressed as $(Na_2O) (P_2O_5)$, sodium tripolyphosphate $(Na_5P_3O_{10})$ will be expressed as $(Na_2O)_5(P_2O_5)_3$, tetrasodium pyrophosphate $(Na_4P_2O_7)$ will be expressed as $(Na_2O)_2(P_2O_5)$, etc.

The present invention can be better understood by reference to the drawing, which illustrates a piece of equipment which has been utilized in the practice of this invention. This equipment comprises a burner 10 having a lower concave surface 11. The upper portion of the burner contains three separated concentric annular spaces 12, 13, and 14. Each of the three concentric annular spaces is covered by a flat circular ring 15, 16, and 17, respectively, which is welded to the burner body to make a gas-tight closure. Each of the rings 15, 16, and 17 contains a hole fitted with a pipe or similar duct 18, 19, and 20 through which gases may be led into the annular spaces 12, 13, and 14. Each of the annular spaces is connected to the space beneath the concave surface of the burner by a series of cylindrical openings. Thus, a series of cylindrical openings, two of which are indicated by the number 21, connect the annular space 12 with the space beneath the concave surface of the burner. Similarly, the series of openings designated by the numbers 22 and 23 connect the annular spaces 13 and 14, respectively, with the space beneath the concave surface of the burner. In the center of the burner is a tapped hole or similar opening 24 fitted with a pipe 25. The axis or center line of each of the cylindrical openings indicated by the numbers 21, 22, and 23 and the axis or center line of the opening 24 all converge at a common point 26 which is designated herein as the focus point of the burner. The burner is mounted on a reaction chamber 27.

In utilizing the above-described equipment to produce, for example, a sodium phosphate from phosphorus, oxygen and soda ash, oxygen is passed through the tube 18 into the annular space 12 and through the opening 21 to the focus point 26 of the burner. At the same time, phosphorus vapors are passed through the tube 20 into the annular space 14 and through the opening 23. Additional oxygen having suspended therein solid or molten sodium carbonate is passed through the pipe 25 and opening 24. All of the aforesaid reactants converge in the vicinity of the point of focus 26 and react very rapidly and with the evolution of a considerable amount of heat and bright yellow light. The overall reaction taking place can be expressed by the following equation:

$$xNa_2CO_3 + 2P + 5/2 O_2 \ldots (Na_2O)_x(P_2O_5) + xCO_2$$

While the overall reaction takes place very rapidly, it probably involves a series of individual reactions or steps, the first of which is the oxidation of phosphorus to form phosphorus pentoxide with the generation of a large amount of heat at a very high temperature. The sodium carbonate is liquefied, vaporized, and/or decomposed to form sodium oxide and carbon dioxide and the sodium oxide and phosphorus pentoxide combine to form the sodium phosphate. The reaction products are then led from the chamber 27 and are rapidly cooled or quenched to a temperature below the melting point of the sodium phosphate product. The rapid cooling or quenching can be carried out, for example, by injecting or spraying cold water into the gaseous products or by directing the gaseous products onto a cold metal surface such as a chilled plate or cooled rotating metal drum. In the latter cases, the solid sodium phosphate product will be deposited upon the metal surface and can be continuously scraped therefrom by a mechanical scraping or abrading action.

While the foregoing description has been set forth in terms of the specific alkali metal salt, sodium carbonate, it should be understood that the description is equally applicable to the use of other alkali metal salts of oxy acids of carbon, nitrogen and sulfur, e. g., potassium carbonate, sodium bicarbonate, sodium sulfate, potassium sulfate, sodium bisulfate, lithium sulfate, sodium sulfite, sodium nitrate, potassium nitrate, sodium nitrate, etc.

Likewise, it should be apparent that many alternatives or variations of the above-described procedure and equipment can be readily utilized in the practice of the present invention. For example, under some conditions it may be desirable or even necessary to operate at a higher temperature than is easily obtainable by the reaction of phosphorus, oxygen, and sodium carbonate. In such a case additional heat may be supplied by introducing gaseous hydrogen, and an additional amount of oxygen to convert said hydrogen to $H_2O$, thereby utilizing the heat of combustion of the hydrogen. It is for this or a similar purpose (i. e., utilization of a supplementary fuel such as hydrogen) that the third annular space has been provided in the above-described burner assembly. (The water vapor produced by the simultaneous combustion of a supplementary fuel such as hydrogen will not adversely affect the present reaction or the phosphate produced therein, provided the reaction mass is not cooled to below the condensation temperature of the water vapor prior to separation of the solid alkali metal phosphate from the reaction product. If this precaution is not observed, water will condense with the phosphate product and may absorb appreciable quantities of reaction product gases such as carbon dioxide, sulfur dioxide or trioxide, etc., which impurities will be difficult to separate from the phosphate product.)

As another alternative or variation of the present invention, some or all of the heat necessary to maintain the reaction at the necessarily high temperature can be supplied from an external source, such as by passing the reactants through an electric arc. When a substantial amount of the heat of reaction is being supplied from sources other than the combustion of phophorus to produce phosphorus pentoxide, some or even all of the phosphorus necessary to form the desired alkali metal phosphate can be introduced as phosphorus pentoxide or as a lower oxide of phosphorus rather than as elemental phosphorus.

The alkali metal salt reactants can be liquefied and atomized, sprayed or otherwise injected directly into the reaction mass or into one of the gaseous reactants entering said mass. However, the temperatures and types of equipment necessary to carry out such liquefaction or vaporization are such as to make that practice relatively unattractive. Consequently, it is preferred to introduce the alkali metal salt reactant into the reaction as a very finely divided solid suspension in one of the gaseous reaction streams, preferably the oxygen reactant stream. Likewise, it is possible that the phosphorus could be introduced to the reaction as solid or liquid phosphorus. However, for practical reasons it is much preferred to first vaporize the phosphorus and then introduce phosphorus vapors to the reaction mass.

It should be pointed out that if the alkali metal salt reactant is introduced to the reaction zone in a condensed state, the reaction must be maintained at the elevated temperature for a sufficient length of time to insure that the condensed reactants have reached a sufficiently high temperature to react substantially completely. Consequently, the rapid cooling of the reaction product should not be initiated too quickly. Since a large amount of heat will be lost by radiation from the flame to the sides of the reaction chamber 27, it may sometimes be necessary or advisable (in order to maintain the reaction temperature high enough and for a sufficient length of time) to line the reaction chamber with a refractory insulating material. If it becomes necessary or desirable to carry out the reaction at an extremely high temperature, it may be necessary to jacket the reaction chamber 27 with a liquid coolant or to utilize other cooling means to keep the walls of the chamber from melting.

The rate at which the suspended, condensed salt reactant is heated to the elevated reaction temperature by the incandescent gaseous reaction mass, and the ease with which said suspended salt reactants can be maintained in suspended condition in the gaseous reaction mass, can both be increased by decreasing the degree of sub-division or particle size of the suspended reactant. For this reason it is recommended that the particle size of the alkali metal salt reactant be reduced to less than 325 mesh, and preferably to a maximum particle size of less than about 10 microns.

The rate at which the overall reaction takes place will be largely a function of the temperature of the reaction zone or mass, which temperature should be maintained considerably above 1500° C., and preferably above 1800° C. or 2,000° C.

As indicated above, the desired alkali metal phosphate products are recovered from the reaction mass by rapidly cooling the mass to below the melting point of the alkali metal phosphate product and thereafter separating the solid phosphate product from the gaseous reaction products. The rate of the cooling is not particularly critical, the primary purpose of cooling quickly being to minimize the presence of molten phosphate salts and the resultant corrosive action thereof. The solid phosphate product can be separated from the other gaseous reactants by any well-known means such as filtering, settling, centrifugal separation such as in cyclone separators, etc.

The relative proportions of the various reactants utilized in the present invention can be varied considerably, depending upon the choice of particular reactants, the reaction conditions employed, and the degree of alkalinity desired in the final phosphate product. In general, the proportion of alkali metal salt reactant will be such as to introduce to the reaction between 1 and 3 atomic proportions of alkali metal for each atomic proportion of phosphorus introduced. The exact proportion will be determined primarily by the desired ratio of alkali metal to phosphorus in the final phosphate product. The amount of oxygen utilized (which may be introduced as pure oxygen, as air, or as oxygen-enriched air) will generally be the minimum stoichiometric amount, or a slight excess thereover, based upon the formation of phosphorus pentoxide with all of the elemental phosphorus supplied. If additional heat is supplied to the reaction by combustion of a supplementary fuel such as hydrogen, the supply of oxygen must, of course, be increased by an appropriate amount.

The following example is illustrative of the process of the present invention.

Example

Gaseous elemental phosphorus (obtained by vaporizing yellow phosphorus at a temperature above 300° C.) was continuously passed into a burner such as illustrated in the drawing and burned with a slight excess over the stoichiometric amount (based upon the formation of phosphorus pentoxide) of pure oxygen. Finely divided (less than 325 mesh) solid sodium carbonate was conveyed into the flame along with the oxygen. The reaction mass was then cooled to a temperature below the melting point of the sodium phosphate product by continuously passing the reaction products through a liquid cooled chamber and allowing solid sodium phosphate to settle in the bottom of the chamber while continuously withdrawing the product gases. The sodium phosphate product formed corresponded approximately to the formula:

$$(Na_2O)_{1.38}(P_2O_5)$$

We claim:

1. A method for producing an alkali metal phosphate which comprises continuously introducing phosphorus, oxygen, and an alkali metal salt of an oxy acid of an element selected from the group consisting of carbon, nitrogen, and sulfur, into a continuously flowing incandescent gaseous reaction mass containing said alkali metal salt dispersed therein and flowing therewith, and maintaining said gaseous reaction mass, including said alkali metal salt, in continuous flow while said salt is converted to an alkali metal phosphate.

2. A method for producing an alkali metal phosphate which comprises continuously introducing phosphorus vapors, oxygen and a finely divided solid alkali metal salt of an oxy acid of an element selected from the group consisting of carbon, nitrogen and sulfur into a continuously flowing incandescent gaseous reaction mass containing said finely divided alkali metal salt dispersed therein and flowing therewith, maintaining said gaseous reaction mass, including said alkali metal salt, in continuous flow while said salt is converted to an alkali metal phosphate, cooling said reaction mass to a temperature below the melting point of said alkali metal phosphate, and thereafter separating the solid alkali metal phosphate from the gaseous reaction products.

3. A method for producing a sodium phosphate which comprises continuously introducing phosphorus vapors, oxygen, and a finely divided solid sodium salt of an oxy acid of an element selected from the group consisting of carbon, nitrogen, and sulfur into a continuously flowing incandescent gaseous reaction mass maintained at a temperature in excess of about 1500° C., and containing said finely divided solid sodium salt dispersed therein and flowing therewith, maintaining said gaseous reaction mass, including said sodium salt in continuous flow while said sodium salt is converted to a sodium phosphate, rapidly cooling said reaction mass to a temperature below the melting point of said sodium phosphate, and thereafter separating the solid sodium phosphate from the gaseous reaction products.

4. The method of claim 3 wherein the sodium salt of an oxy acid of an element selected from the group consisting of carbon, nitrogen, and sulfur is sodium sulfate.

5. The method of claim 3 wherein the sodium salt of an oxy acid of an element selected from the group consisting of carbon, nitrogen, and sulfur is sodium carbonate.

6. The method of claim 3 wherein the sodium salt of an oxy acid of an element selected from the group consisting of carbon, nitrogen, and sulfur is sodium bicarbonate.

7. The method of claim 3 wherein the sodium salt of an oxy acid of an element selected from the group consisting of carbon, nitrogen, and sulfur is sodium nitrate.

References Cited in the file of this patent
UNITED STATES PATENTS

| | | |
|---|---|---|
| 2,142,943 | Kerschbaum | Jan. 3, 1939 |
| 2,142,944 | Kerschbaum | Jan. 3, 1939 |
| 2,266,328 | McCullough | Dec. 16, 1941 |